Patented Dec. 14, 1943

2,336,824

UNITED STATES PATENT OFFICE 2,336,824

INTERPOLYAMIDES

Richard H. Wiley, Wilmington, Del., assignor to E. I. du Pont de Nemours & Company, Wilmington, Del., a corporation of Delaware No Drawing. Application April 18, 1941, Serial No. 389,233

6 Claims. (Cl. 260—78)

This invention relates to synthetic polymeric materials and more particularly to synthetic linear interpolyamides.

The solubility and pliability of polymers obtained from polyamide-forming reactants of the diamine-dibasic acid type are known to be improved in many instances by interpolymerization of a mixture of different reactants of this kind, namely, by polymerization of a mixture of two or more different diamines with one or more dicarboxylic acids, or of two or more different dicarboxylic acids with one or more diamines. The greater solubility and pliability of the interpolyamides serves to make them of particular value for some purposes, but the low softening point of the interpolyamides previously prepared has been a serious drawback which has prevented their application for many uses to which they would otherwise be put.

Four component mixtures, that is those containing two pairs of the above reactants, each pair of which separately will yield a polyamide, have been suggested in general for the preparation of interpolyamides. The simple polyamides have been prepared by reacting separately complementary pairs of the polyamide-forming reactants contained in the four component mixture used in the practice of this invention, but it was not known heretofore that it was possible through selection of these specific components and through their use in certain proportions to obtain interpolyamides which have a high melting or softening point in addition to the desired solubility and pliability.

This invention has as an object the preparation of new and useful interpolyamides. A further object is the production of high molecular weight or fiber-forming interpolyamides which have a high melting point together with good solubility and good pliability. Other objects will appear hereinafter.

The above objects are accomplished by polymerizing a polyamide-forming composition comprising a mixture of reactants consisting essentially of from about 35% to 48% of a substantially equimolecular amount of hexamethylenediamine and sebacic acid, and from about 65% to 52% of a substantially equimolecular amount of tetramethylenediamine and adipic acid. By "substantially equimolecular amount" is meant proportions which do not vary more than about 5% from those theoretically required.

The most practical manner of carrying out the invention is to polymerize the above mentioned pairs of reactants in the form of their diamine-dicarboxylic acid salts, that is by polymerization of a mixture consisting of 35% to 48% hexamethylenediammonium sebacate, and 65% to 52% tetramethylenediammonium adipate. The use of the salts, which are formed simply by intimate contact of the reactants, e. g. in alcohol solution, avoids difficulties in determining equimolecular amounts since the salts contain the combined reactants in equimolecular amounts even when formed from mixtures of diamine and dibasic acid in other proportions.

The soluble interpolyamides of this invention have softening points not lower than about 165° C. and as high as 206° C. Their pliability expressed in terms of the modulus of stiffness (also referred to as bending modulus) is less than $50 \times 10^3$ as determined in the standard manner on the Tinius-Olsen stiffness tester. They are sufficiently soluble in hot 80% aqueous ethyl alcohol to yield 15% by weight solutions. These solutions gel in varying periods which measure comparative solubility and which herein are given in hours. In determining the solubility 1.5 grams of the interpolyamide molded into a thin sheet is heated with 8.5 grams of 80% aqueous ethyl alcohol (80 parts by volume of 95% ethanol and 20 parts of water) just below its boiling point in a flask provided with a reflux and stirrer. When the sample dissolves the flask is tightly stoppered and allowed to stand at room temperature. The solution is watched to notice the time elapsed before gelation or solidification takes place. Solubility in aqueous ethyl alcohol is important in connection with the application of the interpolyamides as coating and impregnating compositions because aqueous ethyl alcohol is easily volatilized, is non-corrosive, and relatively cheap. The interpolyamides are also soluble in ethylene chlorohydrin and in methanol-chloroform mixtures.

The softening points of the interpolyamides are determined by pressing lightly a film of the polymer 25–30 mils in thickness against a heated copper block at various intervals while the temperature of the block is slowly raised. The temperature recorded as the softening point is that at which the strip of polymer sticks to the surface of the block.

The following examples are further illustrative of the practice of the invention.

Example I

An interpolyamide is prepared from 38% hexamethylenediammonium sebacate and 62% tetramethylenediammonium adipate by the following procedure: Seventy-six parts by weight of hexamethylenediammonium sebacate having a pH of 7.30 and 124 parts by weight of tetramethylenediammonium adipate having a pH of 7.25 are placed in a glass tube which is sealed and heated at 210°–220° C. for 2 hours and then, after opening, is heated for two hours at 255° C. under a vacuum of 3–4 mm. The resulting polymer obtained after the final heating period is a clear, tough polymer having a softening point of 199° C. The polymer is soluble to the extent of 15% by weight in 80% aqueous ethanol.

Example II

An interpolyamide is prepared from a mixture consisting of 40% hexamethylenediammonium sebacate and 60% tetramethylenediammonium adipate by heating 12 parts by weight of the former salt with 18 parts by weight of the latter in a sealed tube in the manner described in Example I. The resulting polymer after the final heating period is a clear, tough polymer having a softening point of 193° C. and a modulus of stiffness of $37.4 \times 10^3$ lbs./sq. in. The polymer is soluble in 80% aqueous ethanol and a 15% by weight solution gels, that is, solidifies, after remaining fluid at room temperature for 1.1 hours. The polymer has an intrinsic viscosity of 1.05 and is readily spun into pliable filaments.

Example III

An interpolyamide is prepared from 48% hexamethylenediammonium sebacate and 52% tetramethylenediammonium adipate as follows: Seventy-two parts by weight of hexamethylenediammonium sebacate having a pH of 7.30 and 78 parts by weight of tetramethylenediammonium adipate having a pH of 7.35 are placed in a glass tube which is sealed and heated as described in Example I. The resulting polymer is a clear, tough polymer having a softening point of 165° C. The polymer is soluble in 80% aqueous ethanol and a 15% by weight solution gels after remaining fluid at room temperature for three hours.

Example IV

An interpolyamide is prepared from 40% hexamethylenediammonium sebacate and 60% tetramethylenediammonium adipate in the following manner: In an aluminum lined autoclave are placed 200 parts by weight of hexamethylenediammonium sebacate having a pH of 7.30, 300 parts by weight of tetramethylenediammonium adipate having a pH of 7.25, 0.344 part by weight of acetic acid as viscosity stabilizer, and 50 parts by weight of distilled water. The reactants are heated under an inert atmosphere at 230° C. under 250 pounds steam pressure for two hours. At the end of this time the pressure is reduced over a period of one-half hour to atmospheric pressure and the autoclave is then evacuated by means of a vacuum pump. The heating is continued under a vacuum of 4–10 mm. for two hours at 260° C. After cooling under an inert atmosphere, the polymer is removed from the autoclave. The polymer is a light-colored, tough product having an intrinsic viscosity of 0.80 and a melt viscosity of 517 poises at 250° C. The polymer is soluble in hot aqueous 80% ethanol; a 15% by weight solution gels after remaining fluid at room temperature for about one hour, and has a softening point of about 193° C.

The polymerization is preferably continued until the polymer has an intrinsic viscosity, as defined in U. S. Patent 2,130,948, of at least 0.4 in order to obtain the more valuable high molecular weight or fiber-forming interpolyamide. The polymers of lower molecular weight are, however, useful for some purposes, as for instance ingredients in coating compositions. The polymerization of either the mixture of diamines and dicarboxylic acids, or of their equivalents, the salts, as in the above examples, can be carried out by any of the previously known methods for making polyamides. With reference to the use of the salts, it should be stated that instead of using two salts as in the foregoing examples, the same results are obtained by using the diamines and dicarboxylic acids in other salt combinations providing the quantities of the four initial reactants used is not changed. For example, the same interpolyamide is obtained by using hexamethylenediammonium sebacate and tetramethylenediammonium adipate in a 40:60 molar ratio (corresponding to a weight ratio of about 47.5:52.5) as is obtained by using hexamethylenediammonium adipate, tetramethylenediammonium sebacate, and tetramethylenediammonium adipate in molar proportions of 40:40:20.

The mention herein of the particular diamines and dicarboxylic acids used for carrying out the invention is intended to include also the amide-forming derivatives which are known to be the equivalent of the diamines and dicarboxylic acids for the preparation of polyamides. Amide-forming derivatives of the dicarboxylic acids comprise the mono- and di-ester, the anhydride, the mono- and di-amide, acid halide, and the following compounds in the presence of water: Nitrile, cyanocarboxylic acid, cyanoamide, and cylic imide. Amide-forming derivatives of the diamines include the carbamate, N-formyl derivative and the N, N′-diformyl derivative. On hydrolysis with hydrochloric acid the present interpolyamides yield a mixture of hexamethylenediamine hydrochloride, tetra-methylenediamine hydrochloride, adipic acid, and sebacic acid in proportions corresponding to those previously mentioned.

Unless the specified reactants are present in the proportions given herein the resulting interpolyamide does not possess the characteristics previously pointed out with regard to softening point, pliability and solubility which would recommend this polymer as being advantageous over the general class of interpolyamides previously prepared which, when soluble and pliable, have undesirably low softening points.

The significance of the proportions of the reactants used in making the present interpolyamides will be apparent from the following facts. The interpolyamide prepared from a mixture of the two salts containing 48% of the hexamethylenediammonium sebacate has a softening point of 165° C. and a solubility on the basis of gel time previously mentioned of 3.0. But if the amount of this salt in the mixture is substantially raised, as for instance to 55%, the softening point is 158° C. and the solubility instead of increasing decreases to 0.5. With still higher ratios of hexamethylenediammonium sebacate in the mixture the softening point rises but the polyamide obtained is completely insoluble in aqueous ethanol. On the other hand, when the proportion of the hexamethylenediammonium sebacate is near the minimum permissible in the practice of this invention, about 35%, the resulting polyamide, although having the high softening point of 206° C. still retains a substantial solubility of 0.2. If the proportion of the mentioned salt is further lowered in substantial amount the polymer obtained is insoluble.

The present interpolyamides all are soluble in hot 80% aqueous ethanol and have a softening point from 10° C. to 50° C. higher than other interpolyamides of like solubility that have been prepared previously. The preferred interpolyamide is that obtained by polymerizing a mixture of 40% hexamethylenediammonium sebacate and 60% tetramethylenediammonium adipate. This polymer has a softening point of 193° C. and a modulus of stiffness of $37.4 \times 10^3$ lbs./sq. in.

The interpolyamides of this invention, by reason of their high softening points in combination with good pliability and solubility, are of enhanced utility for many of the purposes for which polyamides are useful. The interpolyamides disclosed herein are of particular value in the manufacture of such products as fibers, wrapping foils, and coatings for fabrics.

As many apparently widely different embodiments of this invention may be made without departing from the spirit and scope thereof, it is to be understood that I do not limit myself to the specific embodiments thereof except as defined in the appended claims.

I claim:

1. An interpolyamide melting above 165° C. and soluble in hot aqueous alcohol to the extent of at least 15% by weight of the interpolyamide, said interpolyamide comprising the reaction product obtained by heating polyamide-forming reactants which comprise essentially from about 35% to 48% by weight of hexamethylenediamine and sebacic acid in substantially equimolecular proportions, and from about 65% to 52% by weight of tetramethylenediamine and adipic acid in substantially equimolecular proportions.

2. An interpolyamide melting above 165° C. and soluble in hot aqueous alcohol to the extent of at least 15% by weight of the interpolyamide, said interpolyamide comprising the reaction product obtained by heating polyamide-forming reactants which comprise essentially about 40% by weight of a substantially equimolecular amount of hexamethylenediamine and sebacic acid, and about 60% by weight of a substantially equimolecular amount of tetramethylenediamine and adipic acid.

3. An interpolyamide which has an intrinsic viscosity of at least 0.4 and which is the reaction product of the reactants as defined in claim 1.

4. An interpolyamide which has an intrinsic viscosity of at least 0.4 and which is the reaction product of the reactants as defined in claim 2.

5. A process for making an interpolyamide which melts above 165° C. and which is soluble in hot aqueous alcohol to the extent of at least 15% by weight, said process comprising heating to polymerizing temperature a mixture comprising essentially from about 35% to 48% by weight of a substantially equimolecular amount of hexamethylenediamine and sebacic acid, and from about 65% to 52% by weight of a substantially equimolecular amount of tetramethylenediamine and adipic acid.

6. A process for making an interpolyamide which melts above 165° C. and which is soluble in hot aqueous alcohol to the extent of at least 15% by weight, said process comprising heating to polymerizing temperature from about 35% to about 48% by weight of hexamethylenediammonium sebacate and from about 65% to about 52% by weight of tetramethylenediammonium adipate, and continuing said heating until an interpolyamide having an intrinsic viscosity of at least 0.4 is formed.

RICHARD H. WILEY.